(12) United States Patent
Back et al.

(10) Patent No.: US 7,991,920 B2
(45) Date of Patent: Aug. 2, 2011

(54) SYSTEM AND METHOD FOR CONTROLLING INFORMATION OUTPUT DEVICES

(75) Inventors: Maribeth Joy Back, Berkeley, CA (US); Margaret H. Szymanksi, Santa Clara, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 10/741,662

(22) Filed: Dec. 18, 2003

(65) Prior Publication Data

US 2005/0006154 A1 Jan. 13, 2005

Related U.S. Application Data

(60) Provisional application No. 60/435,064, filed on Dec. 18, 2002.

(51) Int. Cl.
*G06F 3/00* (2006.01)
(52) U.S. Cl. .................. 710/5; 710/7; 710/17; 710/18; 710/30; 710/58; 710/62
(58) Field of Classification Search .................. 710/5, 7, 710/17, 18, 30, 58, 62
See application file for complete search history.

(56) References Cited

U.S. PATENT DOCUMENTS

| | | | | |
|---|---|---|---|---|
| 4,363,029 | A * | 12/1982 | Piliavin et al. | 340/501 |
| 5,455,945 | A * | 10/1995 | VanderDrift | 707/2 |
| 5,682,032 | A | 10/1997 | Philipp | |
| 5,875,257 | A | 2/1999 | Marrin et al. | |
| 5,991,693 | A | 11/1999 | Zalewski | |
| 6,262,662 | B1 | 7/2001 | Back et al. | |
| 6,272,231 | B1 * | 8/2001 | Maurer et al. | 382/103 |
| 6,292,176 | B1 * | 9/2001 | Reber et al. | 345/169 |
| 6,414,671 | B1 * | 7/2002 | Gillespie et al. | 345/157 |
| 6,452,514 | B1 | 9/2002 | Philipp | |
| 6,512,838 | B1 | 1/2003 | Rafii et al. | |
| 6,690,275 | B2 * | 2/2004 | Long et al. | 340/525 |
| 6,804,396 | B2 * | 10/2004 | Higaki et al. | 382/181 |
| 6,853,367 | B1 * | 2/2005 | Liebenow | 345/168 |
| 6,865,572 | B2 * | 3/2005 | Boguraev et al. | 707/5 |
| 6,888,536 | B2 * | 5/2005 | Westerman et al. | 345/173 |
| 6,930,673 | B2 * | 8/2005 | Kaye et al. | 345/173 |
| 6,950,534 | B2 * | 9/2005 | Cohen et al. | 382/103 |
| 2002/0087526 | A1 * | 7/2002 | Rao | 707/3 |

OTHER PUBLICATIONS

U.S. Appl. No. 09/707,923, filed Nov. 8, 2000, Bentley et al.
U.S. Appl. No. 09/512,768, filed Feb. 25, 2000, Back et al.
U.S. Appl. No. 09/512,886, filed Feb. 25, 2000, Back et al.
Back, M. et al., "Designing Innovative Reading Experiences for a Museum Exhibition," *IEEE Computer*, 34: 1-8 (2001).

(Continued)

*Primary Examiner* — Tariq Hafiz
*Assistant Examiner* — Jasjit S Vidwan
(74) *Attorney, Agent, or Firm* — Patrick J. S. Inouye; Krista A. Wittman

(57) ABSTRACT

System and method for controlling the presentation of information, such as dynamically displayed text, includes a computer with a display device and one or more sets of electrode plates and capacitive field sensors arranged facing each other on a substantially flat and substantially stationary surface, such as a table top. The method includes forming capacitive fields between the electrodes and sensors by electrically charging the electrode plates. The sensors monitor for gestural movements made by a user's hands within the fields by detecting changes in voltage levels of the fields. In response to detected gestural movements, the computer adjusts the manner in which the information is presented in the display device, such as the display rate, information source, font size and contrast control.

12 Claims, 4 Drawing Sheets

OTHER PUBLICATIONS

Funk, K., *Electronic Books and Text Materials for Persons with Disabilities*, [Retrieved from the Internet at http://www.dinf.org/csun_98/csun98_131.htm on Sep. 12, 2001].

Rayner, K., "Eye Movements in Reading and Information Processing," *Psychological Bulletin*, American Psychological Association, Inc., 85: 618-660 (1978).

Potter, M., "Rapid Serial Visual Presentation (RSVP): A Method for Studying Language Processing," *New Methods in Reading Comprehension Research*, Lawrence Erlbaum Associates, pp. 91-118 (1984).

Back et al., "Listen Reader: an electronically augmented paper-based book," *Xerox PARC* (2001).

Back et al., "Speeder Reader: An Experiment in the Future of Reading," *Xerox PARC* (2001).

Back et al., "The AirBook: force-free interaction with dynamic text in an assistive reading device," *Xerox PARC* (2001).

Zimmerman et al., "Applying Electric Field Sensing to Human-Computer Interfaces," *MIT Media Laboratory—Physics and Media Group* (1995) [Retrieved from the Internet at http://www.acm.org/sigchi/chi95/proceedings/papers/tgz_bdy.htm on Dec. 20, 2001].

Smith et al., "Electric Field Sensing for Graphic Interfaces," *MIT Media Laboratory—Physics and Media Group* (1998) (To be published in the Special Issue on Input Devices, IEEE Computer Graphics and Applications, May 1998).

(Author Unknown), Motorola, Inc., "BiStatix Technology, A White Paper, Version 4.0" (1999) [Retrieved from the Internet at http://citeseer.nj.nec.com/context/1175210/0 on Dec. 28, 2001].

(Author Unknown), Happ Controls Technical Manual for CIB-1000 (2000) [Retrieved from the Internet at http://happcontrols.com on Jan. 8, 2002].

Phillip, Hal, Quantum Research Group Ltd., "Electrode Design for Charge Transfer Sensing," [Retrieved from the Internet at http://www.qprox.com/background/electrodes.shtml].

Phillip, Hal, Quantum Research Group Ltd., "Charge Transfer Sensing: Spread Spectrum Sensor Technology Blazes New Applications," (1997) [Retrieved from the Internet at http://www.qprox.com/background/white.pdf on Jan. 9, 2002].

Quantum Research Group Ltd., "QproxTM QT110/QT110H Charge-Transfer Touch Sensor," (1999) [Retrieved from the Internet at http://www.qprox.com/downloads/qt110.pdf].

(Author Unknown) "Java™ 2 Platform, Standard Edition (J2SE™) Version 1.3," *Sun Microsystems, Inc.* (2000) [Retrieved from the Internet at http://java.sun.com/j2se/J2Sev1.3.datasheet.pdf on Jan. 10, 2002].

Aberdeen Group, "Delivering Real-World Benefits with Client-Side Java Technology, An Executive White Paper," Aberdeen Group, Inc. (2000) [Retrieved from the Internet at www.aberdeen.com on Jan. 10, 2002].

(Author Unknown) "Java™ 2 Platform, Standard Edition, Version 1.3," (2001) [Retrieved from the Internet at http://java.sun.com/j2se/1.3 on Jan. 9, 2002].

Jones, J., "XML 101," (2002) [Retrieved from the Internet at http://www.swynk.com/friends/jones/articles/xml_101.asp on Jan. 9, 2002].

Walsh, N., "What is XML?" (1998) [Retrieved from the Internet at http://www.xml.com/pub/a/98/10/guide1.html on Jan. 9, 2002].

(Author Unknown) "Extensible Markup Language (XML) 1.0 (Second Edition) W3C Recommendation Oct. 6, 2000" [Retrieved from the Internet at http://www.w3.org/TR/2000/REC-xml-20001006.pdf on Jan. 9, 2002].

(Author Unknown) Xerox PARC Listen Reader Project, Xerox PARC Brings Life to Reading with QProx™ Technology *Quantum Research Group* (2001) [Retrieved from the Internet at http://qprox.com/news/xerox/shtml on Dec. 5, 2001].

Baxter, L., "Capacitive Sensors: Design and Applications,", IEEE Press Series on Electronic Technology (Aug. 1996) [Table of Contents Only].

D. Waxman, "Digital Theremins: Interactive Musical Experiences for Amateurs using Electric Field Sensing," MS Thesis, Massachusetts Institute of Technology, Summer 1995, 98 pages.

J. Paradiso and N. Gershenfeld, "Musical Applications of Electric Field Sensing" Computer Music Journal, vol. 21, No. 3, Summer 1997, pp. 69-89.

\* cited by examiner ent of U.S. Provisional
SYSTEM AND METHOD FOR CONTROLLING INFORMATION OUTPUT DEVICES This application claims the benefit of U.S. Provisional Patent Application Ser. No. 60/435,064 filed on Dec. 18, 2002, which is hereby incorporated herein by reference in its entirety.

FIELD

This invention relates generally to systems and methods for information display and, more particularly, to a method and system of controlling information display devices with sensors to adjust the manner in which information is presented.

BACKGROUND

Information display devices are being made to accommodate disabled persons. For example, text-to-speech converting systems and robotics based book manipulating devices are intended to assist operators who have problems physically handling such devices, such as books, electronic books, portable document readers and hand-held devices. Unfortunately, these devices cannot accommodate all of the different types of disabilities an operator may have. Additionally, these devices are often quite expensive.

For instance, dyslexics may have difficulty making eye movements (i.e., saccadic jumps) and focusing on information displayed using conventional methods and devices. Devices that display information using various dynamic display techniques have provided some relief for these people, although they may not provide a complete and inexpensive solution. Since dynamic display techniques can involve rapidly displaying information in unusual formats and at varying display rates, it becomes increasingly necessary for operators to quickly make subtle adjustments for changing the rate text is displayed, the manner in which the text is displayed (e.g., text color, font size, etc.), finding different sections of displayed text, or re-displaying portions of text, for example. Those with impaired motor skills having diminished or limited physical coordination could experience difficulties handling small device controls (e.g., switches, joysticks, buttons, etc.) typically used for making such fine adjustments.

SUMMARY

A system for controlling the presentation of information in accordance with embodiments of the present invention includes a sensor system that monitors for gestural movement, a presentation system that presents at least one portion of information in a display portion of an information display device, and a processing system that adjusts the presentation based upon the monitored gestural movement.

A method and a program storage device readable by a machine and tangibly embodying a program of instructions executable by the machine for controlling the presentation of information in accordance with embodiments of the present invention include monitoring for gestural movement, presenting at least one portion of information in a display portion of an information display device, and adjusting the presentation based upon the monitored gestural movement.

The present invention provides a convenient, efficient and inexpensive system and method for easily controlling the display of information, such as dynamically presented text. Moreover, the present invention enables users having a broad range of disabilities to comfortably control the way information is presented by significantly reducing the need for direct physical manipulation of device controls thereby involving a minimal amount of direct physical contact.

DETAILED DESCRIPTION

Figure 1:
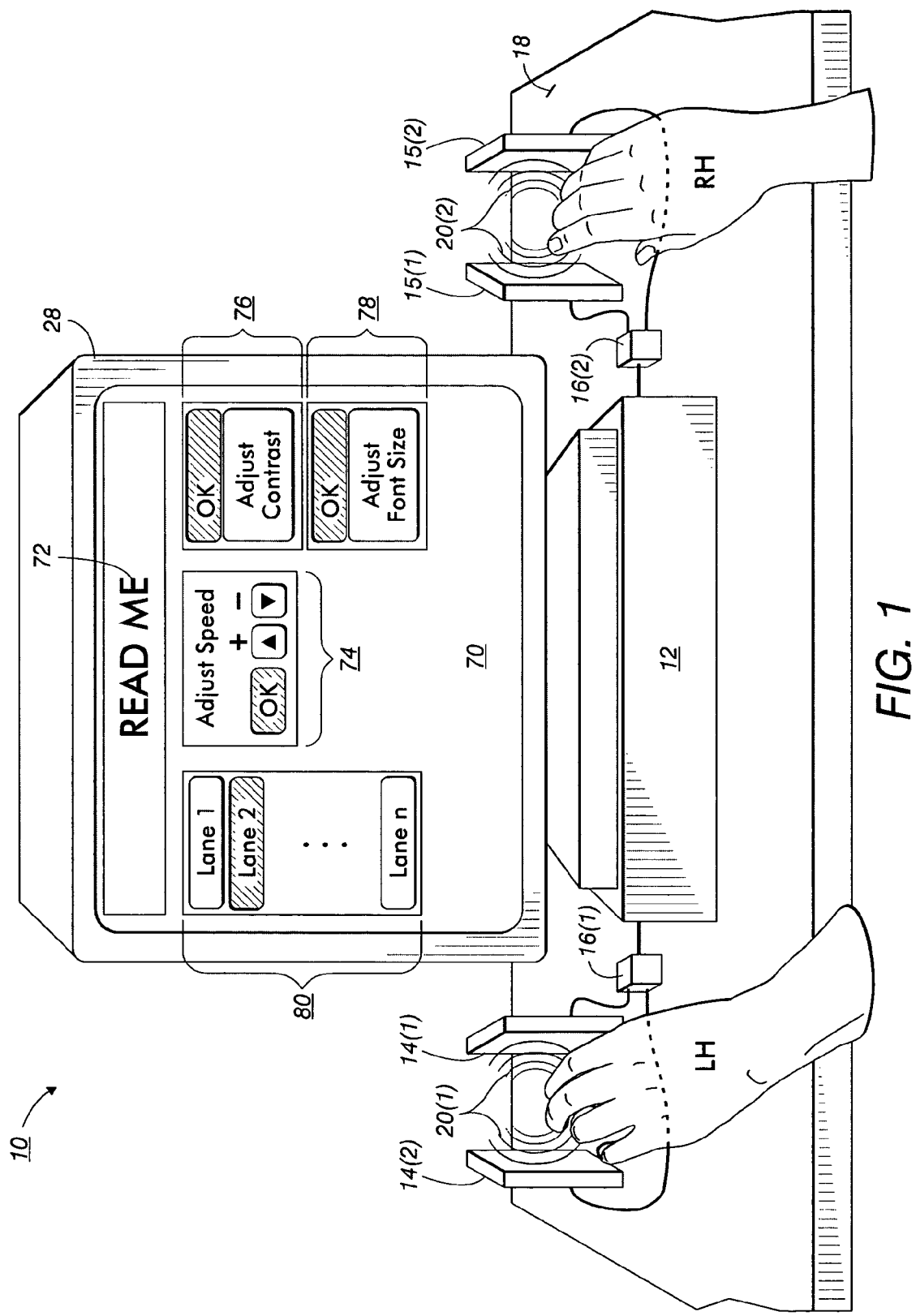
FIG. 1 is a perspective view of a system for controlling the presentation of information in accordance with embodiments of the present invention.
Figure 2:
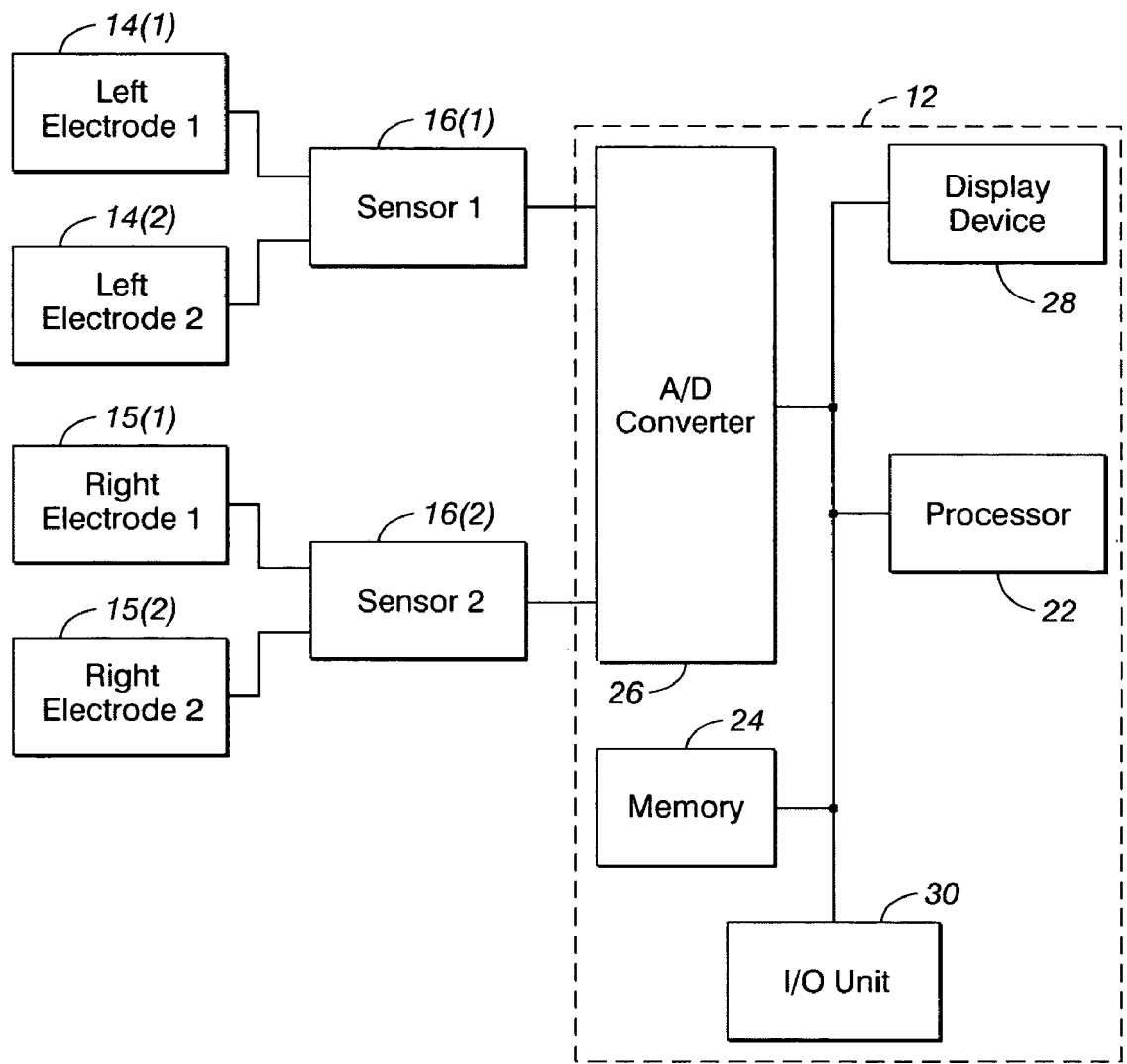
FIG. 2 is a block diagram of an exemplary device used in a system for controlling the presentation of information.

A system 10 for controlling the presentation of information in accordance with embodiments of the present invention is shown in FIGS. 1 and 2. The system 10 includes device 12, electrodes 14(1), 14(2) and 15(1), 15(2), and sensors 16(1), 16(2). A method in accordance with embodiments of the present invention includes device 12 monitoring for gestural movements made by one or more of hands LH, RH within capacitive fields 20(1), 20(2) using sensors 16(1), 16(2), presenting at least one portion of information using display device 28, and adjusting the presentation based upon the monitored gestural movements. The present invention provides a convenient, efficient and inexpensive system 10 and method for easily controlling the display of information, such as dynamically presented text. Moreover, the present invention enables users having a broad range of disabilities to comfortably control the way information is presented by significantly reducing the need for direct physical manipulation of device controls thereby involving a minimal amount of direct physical contact.

Referring more specifically to FIG. 1, device 12 is coupled to sensors 16(1), 16(2) by one or more wire leads, although other conductive means capable of transferring electrical signals between device 12 and sensors 16(1), 16(2) may be used. Further, the electrodes 14(1), 14(2) and 15(1), 15(2) are each coupled to the sensors 16(1), 16(2), respectively, by the wire leads. Device 12 may comprise a personal computing device or any type of stationary or portable machine, such as a laptop computer, a hand-held computer, a personal digital assistant, a portable document reader or an electronic book, which is configured to operate with the components associated with device 12 to perform methods in accordance with the present invention as described and illustrated herein.

Electrodes 14(1), 14(2) and 15(1), 15(2) each comprises a conductive plate made of a copper foil material, although other conductive materials may be used. In embodiments of the present invention, electrodes 14(1), 14(2) and 15(1), 15(2) each have a substantially square shape with a length of about three inches, a width of about three inches and a depth of about ⅟₃₂ of an inch, although a number of other shapes and dimensions may be utilized as long as its operation as described herein remains substantially the same. Further, electrodes 14(1), 14(2) and 15(1), 15(2) may each have an outer layer covering made of a leather material having a thickness of about ⅛ of an inch to make the electrodes 14(1), 14(2) and 15(1), 15(2) aesthetically pleasing, although other materials and thicknesses may be utilized. In embodiments of the present invention, any number of electrodes 14(1), 14(2) and 15(1), 15(2) may be used, the number depending upon the number of sensors 16(1), 16(2) used in the system 10.

Sensors 16(1), 16(2) each comprises capacitive field sensing units, such as a model QTM1001AS charge transfer sensor manufactured by Quantum Research Group Ltd., Southampton, Hants England, examples of which are described in the QProx™ QT110/QT110H Charge-Transfer Touch Sensor Technical Specification; the white paper on "Electrode Design for Charge Transfer Sensing," Hal Philipp, Quantum Research Group Ltd.; and the white paper on "Charge Transfer Sensing: Spread Spectrum Sensor Technology Blazes New Applications," Hal Philipp, Quantum Research Group Ltd., 1997, all of which are hereby incorporated by reference in their entirety, although other types of sensing systems may be used. For further information with respect to capacitive sensing, see "Capacitive Sensors: Design and Applications," Larry K. Baxter, IEEE Press Series on Electronic Technology, Aug. 1996, which is also hereby incorporated by reference in its entirety.

The sensors 16(1), 16(2) measure conductivity within capacitive fields 20(1), 20(2), respectively, that are formed between each of electrodes 14(1), 14(2) and 15(1), 15(2). Sensors 16(1), 16(2) provide feedback to the device 12 by way of analog electrical signals. Any number of electrodes 14(1), 14(2) and 15(1), 15(2) and sensors 16(1), 16(2) may be used as long as the fields 20(1) and 20(2) between the electrodes 14(1), 14(2) and 15(1), 15(2) and sensors 16(1), 16(2) do not interfere with each other. Further, while the sensors 16(1), 16(2) are shown to be located exterior to the device 12, they may be arranged within device 12.

In embodiments of the present invention, device 12, electrodes 14(1), 14(2) and 15(1), 15(2) and sensors 16(1), 16(2) may rest upon a substantially stationary and substantially flat surface, such as on the top surface of table 18. Each of the electrodes 14(1), 14(2) and 15(1), 15(2) and sensors 16(1), 16(2) is arranged on the table 18 at least about 2-3 inches apart from each other in any direction, although other spacings can be used as long as the fields 20 do not interfere with each other. Further, each pair of electrodes 14(1), 14(2) and 15(1), 15(2) faces each other, although other configurations are possible.

Referring to FIG. 2, the components of device 12 will now be described. In embodiments of the present invention, device 12 includes processor 22, memory 24, A/D converter 26, display device 28 and I/O unit 30, which are coupled together by one or more buses. Processor 22 may comprise an Intel Pentium III® processor, although processor 22 may comprise other processors, such as a PowerPC G4® or a PicoJava I® processor depending upon the particular type of machine device 12 is. The processor 22 executes at least one program of stored instructions for processing digital signals received from A/D converter 26 to perform a method of controlling the presentation of dynamically displayed information in accordance with embodiments of the present invention, although the processor 22 may execute instructions for performing other tasks. The instructions may be expressed as executable programs written in a number of computer programming languages, such as BASIC, Pascal, C, C++, C#, Java, Perl, COBOL, FORTRAN, assembly language, machine code language, all of which are hereby incorporated by reference in their entirety, or any computer code or language that may be understood and executed by the processor 22.

Memory 24 comprises a hard-disk computer-readable medium, although memory 24 may comprise any type of fixed or portable medium accessible by the processor 22 such as a floppy-disk, compact-disc, digital-video disc, magnetic tape, optical disc, Ferro-electric memory, Ferro-magnetic memory, read-only memory, random access memory, electrically erasable programmable read-only memory, erasable programmable read-only memory, flash memory, static random access memory, dynamic random access memory, charge coupled devices or smart cards. Memory 24 stores the instructions for performing methods in accordance with embodiments of the present invention for execution by the processor 22 as described and illustrated herein, although some or all of these instructions may be stored elsewhere. Although the processor 22 and memory 24 are shown in the same physical location, they may be located in different physical locations. Additionally, memory 24 may store the content to be displayed by device 12 although the content may be stored elsewhere as described further herein.

A/D converter 26 comprises a unit that converts analog signals received from sensors 16(1), 16(2) into digital signals, such as a Happ Controls Control Interface Board CIB-1000, an example of which is described in the Happ Controls CIB-1000 Technical Manual, which is hereby incorporated by reference in its entirety. Further, the A/D converter 26 may accept four analog serial inputs and output their converted digital values. Moreover, any quantity of A/D converters 26 units may be used, the number depending upon the number of electrodes 14(1), 14(2) and 15(1), 15(2) and sensors 16(1) and 16(2) used in the system 10. In embodiments of the present invention, the digital signals are sent to the processor 22 to be used as control input during execution of the computer executable instructions stored in the memory 24 for controlling the way information is presented in the display device 28 as described further herein.

Display device 28 comprises a computer monitor, although display device 28 may comprise other types of information output units, such as LCD displays, television displays or audio output units. In embodiments of the present invention, display device 28 displays information, such as text in the form of words that may be sequentially displayed in a fixed location, such as text display window 72 of display screen 70, using a dynamic presentation technique, such as rapid serial visual presentation ("RSVP"). Moreover, the display device 28 may display information using other dynamic presentation techniques, such as scrolling or phrase-by-phrase presentation. Further, the display device 28 may display one or more additional control windows, such as speed control window 74, contrast control window 76, font size control window 78 and text lane control window 80, to provide users of device 12 with visual indications of changes with respect to the manner in which the information is displayed, such as text display rate and text font size.

I/O unit 30 may operatively couple device 12 to other systems and machines via a serial data line, a parallel data line, a local area network, a wide area network, an Intranet or any other type of network, such as the Internet. By way of example only, such systems coupled to device 12 may include a server system with a memory having information stored therein or a scanner device that obtains content from paper documents by converting the information on the documents into an electronic format, either of which may make the information available to device 12 through the I/O unit 30 to be displayed using display device 28 as described herein, although this information may already be stored in the device 12 at memory 24.

Figure 3:
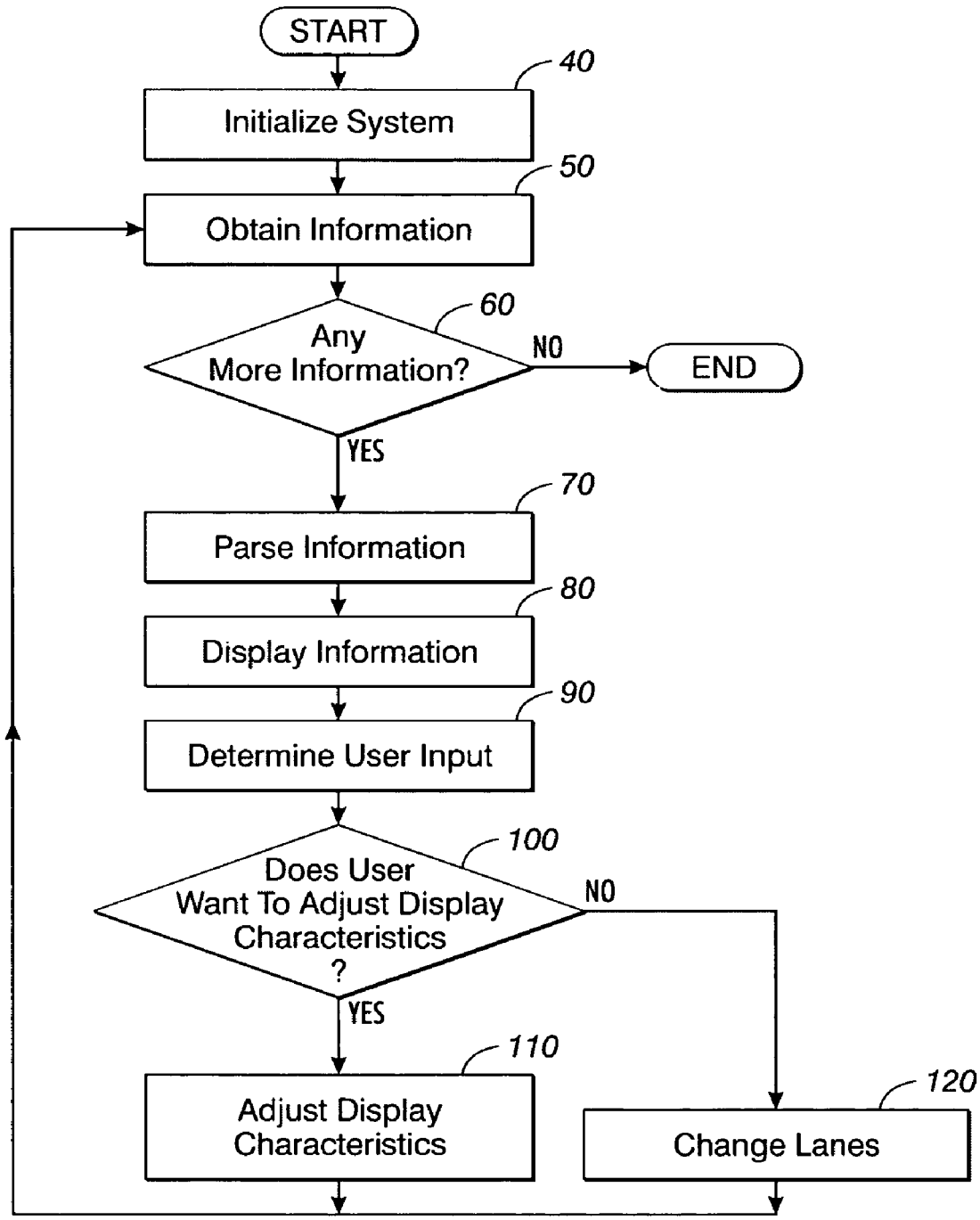
FIGS. 3 and 4 are flow charts of a process for controlling the presentation of information in accordance with embodiments of the present invention.
Figure 4:
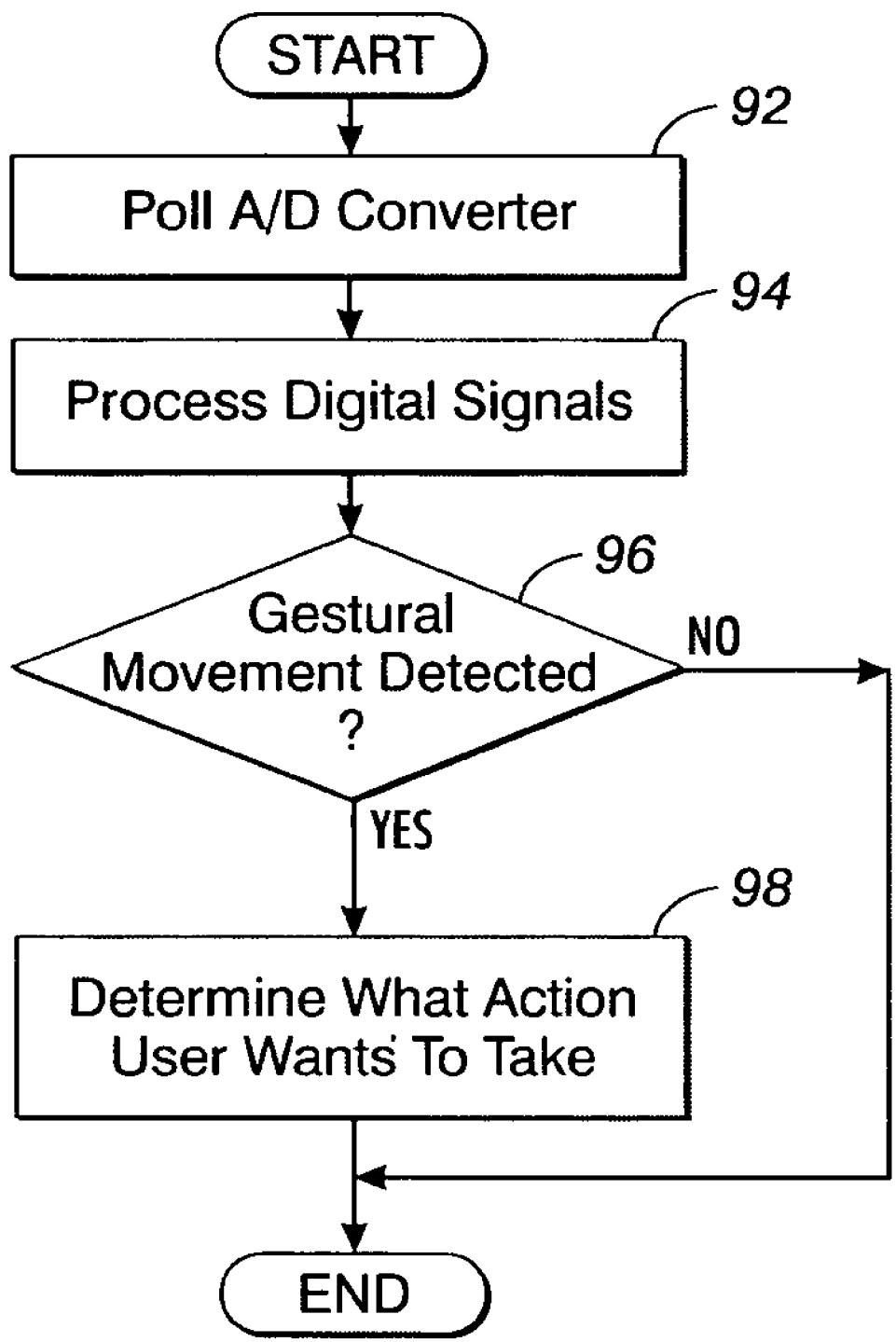

Referring to FIGS. 3-4, the operation of a method for controlling the dynamic presentation of information in accordance with embodiments of the present invention will now be described with reference to FIGS. 1-2. Beginning at step 40, the method starts by system 10 being powered-up and executing an initialization routine. A user may activate a power switch (not illustrated) to initiate the power-up process, for example. Further, device 12 initializes variables and may perform various calibration procedures as needed with respect to electrodes 14(1), 14(2) and 15(1), 15(2), sensors 16(1), 16(2), processor 22 and A/D converter 26, such as to determine what a threshold voltage level should be set at when neither of hands LH, RH are present in fields 20(1), 20(2) since varying environmental conditions may affect the voltage potential of fields 20(1), 20(2) upon system 10 power-up.

Next at step 50, the device 12 obtains information to be displayed. In particular, processor 22 accesses an information database that may be logically organized in memory 24 to retrieve a portion of any information available in the information database to be displayed, although the information database may be organized in a memory of a separate server or other system accessed by device 12 through I/O unit 30. Further, any information obtained from the information database may be stored in a temporary memory buffer in memory 24 for further processing as described herein in connection with step 70. In embodiments of the present invention, the information may include any type of content, such as text and graphics obtained from any source such as a book, magazine, an e-mail message, Web page content, an article, a news feed or an information feed from a speech to text system. Further, the amount of information included in the portion obtained may depend upon values that are defined in the stored programming executed by the processor 22. Moreover, the values may depend upon the maximum amount of information that device 12 should display in the text display window 72 at each instance to comply with dynamic display technique guidelines (e.g., RSVP).

Next at decision box 60, if device 12 determines at step 50 there is no information available in the information database, the NO branch is followed and the method ends, although steps 50-60 may be repeated until device 12 determines that there is information in the information database. However, if device 12 determines there is information available in the information database, then the YES branch is followed.

Next at step 70, device 12 parses the portion of information obtained in step 50. In particular, processor 22 processes the information by stripping superfluous content associated with the information as originally obtained from its source, such as graphics or formatting, to extract the textual content included in the information, which may then be stored at memory 24 in a temporary buffer or file structured in an XML 1.0 format, the specification of which is described in the "Extensible Markup Language (XML) 1.0 (Second Edition)" document, W3C Recommendation, October 2000, which is hereby incorporated by reference in its entirety, although other formats may be used and the information may not need to be parsed for display. Moreover, the display characteristics of the portion of information to be displayed (e.g., text color, text font size, text font type, text background color, etc.) may be specified using the XML tags and identifiers having a default or initial set of display characteristic values, the characteristics being modified as will be described further herein in connection with step 110.

Next at step 80, device 12 displays the parsed information on the display screen 70 of display device 28. In particular, processor 22 may execute a Java 2.0 application, the specification of which is hereby incorporated by reference in its entirety, and stored in the memory 24 or otherwise accessible to device 12 through I/O unit 30. The Java 2.0 application is configured to accept the parsed information stored in the XML format as input. Processor 22, by executing the Java 2.0 application in this context, is able to interpret the XML formatted parsed information to cause the text to be displayed in the manner specified by the XML instructions, which is displayed in a text display window 72 on the display screen 70 using an RSVP display technique described further herein below. For further general information with respect to the Java programming language, see "The Java™ Language Specification Second Edition," Gosling et al., Sun Microsystems, Inc. 2000, which is also hereby incorporated by reference in its entirety.

The processor 22 presents the textual information in the window 72 in the format specified by the XML instructions. Moreover, device 12 is programmed to begin displaying the parsed information using a default set of display characteristic values specified by the XML formatting instructions. For instance, the parsed information (i.e., dynamic text) may be initially displayed at a rate of 1000 words per minute, having a low contrast level and a 12 point font size.

In embodiments of the present invention, the processor 22 executes instructions to cause the textual information to be displayed in the display device 28 using an RSVP technique, which involves displaying portions of information, such as words sequentially, one at a time, at a fixed location (e.g., text display window 72) and at a selected rate, although display device 28 may display information using other dynamic presentation techniques and other non-dynamic presentation techniques. Further, the display device 28 may display one or more additional control windows (e.g., speed control window 74, contrast control window 76, font size control window 78 or text lane control window 80) to provide users of device 12 with visual indications of changes with respect to the manner in which the information is displayed, such as the text display rate and text font size.

Next at step 90, device 12 determines whether the user is generating any input. In particular, the device 12 is able to detect whether the user is making gestural movements within the fields 20(1), 20(2) using one or more of their hands LH, RH. Moreover, device 12 determines what type of input the user is expressing based upon the stored programming it is executing as explained further herein.

Referring to FIG. 4, a process for determining user input in accordance with embodiments of the present invention will now be described in further detail. At step 92, the processor 22 executes a polling routine to monitor for any gestural movement within one or more of fields 20(1), 20(2) by interrogating the A/D converter 26 at predetermined time increments (e.g., every ten milliseconds) to determine whether it has any digital signals available to be retrieved by processor 22 while steps 40-120 are executed as described herein, although A/D converter 26 may be programmed to set a flag, send an interrupt or send the digital signals to processor 22 whenever new data is generated.

Next at step 94, processor 22 processes any available digital signals to determine whether one or more of sensors 16(1), 16(2) detect changes in the voltage levels of fields 20(1), 20(2) that indicate the presence of or movement of one or more hands LH, RH within one or more of the fields 20(1)-20(2). As one or more of sensors 16(1), 16(2) detect gestures or movements, it sends analog signals to the A/D converter 26, although it may continuously send analog signals regardless of whether there are any changes in the voltage levels. In such a case, A/D converter 26 would monitor the received analog signals to determine any fluctuations in the signals indicating changes in the fields 20(1), 20(2) voltage levels. In either case, A/D converter 26 converts the analog signals into digital signals. Further, the A/D converter 26 may associate an identifier with the digital signals to indicate which one of sensors 16(1), 16(2) detected the movement, although processor 22 may also decipher which digital signals are associated with which pair of electrodes 14(1), 14(2) or 15(1), 15(2)

and sensors 16(1), 16(2), respectively, by virtue of the particular A/D converter 26 output leads the digital signals are being sent from.

Thus, a human hand LH or other object may pass through field 20(1), for example. The movement of the hand LH in this example would cause a portion of the electrical signals emitted from the electrodes 14(1), 14(2) and/or the sensor 16(1) to be shunted to a ground source, such as the human body associated with the hand LH, thereby causing the voltage level of the field 20(1) to change by dropping a measurable amount, for example. The voltage level change is reflected in the analog signals sent to the A/D converter 26 from sensor 16(1).

In embodiments of the present invention, the presence and movement of the hands LH, RH at particular locations in the fields 20(1) and 20(2) may cause the voltage levels of the fields to have corresponding values each time the hands move to approximately the same locations. For instance, as a hand LF barely moves into the field 20(1) a voltage level change of a first value or approximately the first value is received by the A/D converter 26. Alternatively, the movement of a hand LF substantially into the field 20(1) so that hand is almost entirely surrounded by the electrodes 14(1), 14(2) may cause the A/D converter to receive a voltage level change of a second value. In embodiments of the present invention, the processor 22 may be configured to perform one or more actions in response to the A/D converter 26 detected particular voltage level changes. Therefore, the user can cause the device 10 to perform different actions based upon the position of the hands LH and/or RH within the fields 20(1) and 20(2).

Next at decision box 96, if processor 22 determines at step 94 that gestural movements have been made in one of fields 20(1), 20(2), then the YES branch is followed.

Next at step 98, device 12 determines what action a user desires taking with respect to changing the display characteristics based upon which one of sensors 16(1), 16(2) detected the gestural movements of hands LH, RH. In embodiments of the present invention, an action database logically organized in memory 24 may store the actions device 12 may take depending upon which one of sensors 16(1), 16(2) detected the presence of and movement of hands LH, RH, although the actions may be determined based upon the position of the hands as described above. For instance, an action database may associate the detection of movement by hand LH in field 20(1) to indicate that a user desires changing one or more display characteristics of device 12. Alternatively, the action database may associate the detection of movement by hand RH in field 20(2) to indicate that a user desires changing to a different lane of information. In embodiments of the present invention, each lane is associated with a different source of information that may be retrieved for display by device 12, although each lane may instead be associated with a different type of information (e.g., e-mail content, streaming video feed, etc.) obtained from one source.

Referring back to decision box 96, if processor 22 does not detect gestural movements in one of fields 20(1), 20(2) then the NO branch is followed.

Referring back to FIG. 3 and now to decision box 100, if device 12 at step 90 determines the user desires adjusting one or more display characteristics (e.g., text display rate, contrast level or font size, etc.) the YES branch is followed.

Next at step 110, device 12 enables users to adjust one or more display characteristics by providing appropriate menus that are displayed on display screen 70. In embodiments of the present invention, device 12 may display a speed control window 74, a contrast control window 76 and a font size control window 78 while displaying the dynamic text in the text display window 72. Initially, device 12 may display the speed control window 74 having three selection buttons including an "OK," increase (e.g., "+") and a decrease (e.g., "−") button, where processor 22 causes one of them to be highlighted using a number of techniques such as reverse video, for example.

In embodiments of the present invention, the Java 2.0 parsing application mentioned above in connection with step 70 may include the appropriate instructions for changing the text display characteristics based upon the detected input. Thus, processor 22 may be programmed to determine the user would like to adjust the display rate of the text being displayed in the text display window 72 when it detects movement by hand LH in the field 20(1) associated with sensor 16(1).

As illustrated in FIG. 1, the speed control window 74 is initially shown with the "OK" button highlighted. However, when device 12 detects the user's desire to adjust the text display rate as explained above in connection with steps 92-98, it may cause one of the other buttons within the speed control window 74 (i.e., the "+" or "−" button) to be highlighted to indicate that the text display rate is being adjusted. For instance, the increase button (i.e., "+") may be initially highlighted upon device 12 detecting the user's desire to adjust the text display rate. Moreover, processor 22 may be programmed to begin gradually increasing the text display rate of the information in the text display window 72 a predetermined amount of time after detecting the user's intention, such as one second after. Further, the processor 22 may increase the text display rate by incremental display rate values such as by a factor of about 100 words per minute every three seconds, although other incremental values and predetermined time values may be used. Processor 22 may then increase the text display rate until a maximum display rate value has been reached (e.g., about 4,000 words per minute) or device 12 detects the user's desire to halt increasing the text display rate by detecting additional user input by the user making subsequent gestural movements in the same field 20(1) and steps 92-98 being executed as described above.

In embodiments of the present invention, steps 40-90 may be performed simultaneously. Thus, while step 110 is being performed as described herein, device 12 performs steps 40-90. In particular, at step 90, device 12 determines whether the user has generated additional input depending upon the detection of gestural movements within fields 20(1)-20(2). However, device 12 processes the user input depending upon the user's prior input. For example, as described above, device 12 determined the user's desire to adjust the text display rate. Thus, upon device 12 executing steps 40-90, additional user input may be detected at step 90, and thus processor 22 is programmed to change one of the control windows (i.e., speed control window 74) to reflect the effects of the user input upon the programming of processor 22 during execution. Therefore, in this example, upon determining additional user input at step 90, device 12 may highlight the decrease button in the speed control window 74 if processor 22 detected that the user desired decreasing the text display rate based upon detecting movement of hand LH within field 20(1). Processor 22 may then be programmed to change the speed control window 74 so that the "OK" button is once again highlighted to indicate that the text display rate of the information in the text display window 72 is no longer being adjusted.

Referring back to decision box 100, if device 12 determines at step 90 the user does not desire adjusting any display characteristics, but instead determines the user desires displaying information in the text display window 72 that is obtained from a different lane, the NO branch is followed.

Next at step 120, device 12 changes to a different information lane by attempting to obtain information from a different source, although device 12 may attempt obtaining a different type of information from the same source. In embodiments of the present invention, device 12 indicates to a user which lane the information being displayed in the text display window 72 is being obtained from using the text lane control window 80. As shown in FIG. 1, device 12 causes each lane number indicator in text lane control window 80 to be highlighted using the techniques described above in step 110. Further, each lane indicated in the text lane control window 80 may be associated with a number of types of information such as Web page content, a news feed or information output from a speech to text conversion system. Thus, when device 12 determines the user's desire to change from one lane to another, it will modify the way the text lane control window 80 is displayed and process additional user input received in the same manner described above in steps 90-110.

In embodiments of the present invention, the text display characteristic control windows (e.g., speed control window 74, contrast control window 76 and font size control window 78) are illustrated and described by way of example only. Thus, the appearance and operation of the control windows used to provide users of system 10 with visual indications of the particular display characteristics being modified during operation of the present invention as described above in steps 40-120 are but one of many possible implementations.

In another embodiment of the present invention, steps 40-110 are executed in the same manner described above, except at step 110 device 12 determines the user desires changing the contrast level of the information being displayed in the text display window 72. Thus, device 12 changes the way the contrast control window 76 is displayed and adjusts the contrast level of the information displayed in the text display window 72 in the same manner described at step 110 with respect to adjusting the text display rate, except the contrast levels are adjusted.

In another embodiment of the present invention, steps 40-110 are executed in the same manner described above, except at step 110 device 12 determines the user desires changing the font size of the text displayed in the text display window 72. Thus, device 12 changes the way the font size control window 78 is displayed and adjusts the font size of the information displayed in the text display window 72 in the same manner described in step 110 except the font sizes are adjusted.

While particular embodiments have been described, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefor, is not intended to limit the claimed processes to any order except as may be specified in the claims.

What is claimed is:

1. A system comprising:
an information database for storing information;
a free hand motion sensor system, comprising:
at least one pair of conductive plates configured to face one another;
a capacitive region defined between the pair of conductive plates; and
at least one sensor coupled to the pair of conductive plates to detect at least one of a presence, movement, and position of a user's appendage within the capacitive region;
an information display device to display the information associated with at least one lane of information selected from a plurality of lanes of information based upon the movement of the user's appendage, wherein each lane of information is associated with different sources of information comprising one or more of textual, web page, newsfeed, electronic mail, and streaming video feed information, wherein the information display device is configured to dynamically display at least one portion of the information sequentially in a fixed location of a display portion; and
a processing system configured to adjust at least one display characteristic comprising one or more of contrast level, display format and display rate of the information in the display portion of the information display device based upon signals from the presence, movement, and position of the user's appendage in the capacitive region.

2. The system as set forth in claim 1 wherein the user's appendage is one or more hands.

3. The system as set forth in claim 1, wherein controls for the contrast level, the display format and the display rate are presented for display.

4. The system as set forth in claim 1, further comprising:
a further capacitive region defined between a further pair of conductive plates, wherein the capacitive region and the further capacitive region do not interfere with each other.

5. A method comprising:
maintaining a free hand motion sensor system comprising at least one pair of conductive plates configured to face one another, a capacitive region defined between the pair of conductive plates, and at least one sensor coupled to the pair of conductive plates;
monitoring the capacitive region defined between the pair of conductive plates;
detecting at least one of a presence, movement, and position of a user's appendage within the capacitive region;
displaying information associated with at least one lane of information selected from a plurality of lanes of information based upon the movement of the user's appendage, wherein each lane of information is associated with different sources of information comprising one or more of textual, web page, newsfeed, electronic mail, and streaming video feed information;
dynamically displaying at least one portion of the information sequentially in a fixed location of a display portion of an information display device; and
adjusting at least one display characteristic comprising one or more of contrast level, display format and display rate of the information displayed based upon signals from the presence, movement, and position of the user's appendage in the capacitive region.

6. The method as set forth in claim 5, wherein the user's appendage is one or more hands.

7. The method as set forth in claim 5, wherein controls for the contrast level, the display format and the display rate are presented for display.

8. The method as set forth in claim 5, further comprising:
monitoring a further capacitive region defined between a further pair of conductive plates, wherein the capacitive region and the further capacitive region do not interfere with each other.

9. A computer-readable medium having stored thereon instructions, which when executed by at least one processor, causes the processor to perform:

maintaining a free hand motion sensor system comprising at least one pair of conductive plates configured to face one another, a capacitive region defined between the pair of conductive plates, and at least one sensor coupled to the pair of conductive plates;

monitoring the capacitive region defined between the pair of conductive plates;

detecting at least one of a presence, movement, and position of a user's appendage within the capacitive region;

displaying information associated with at least one lane of information selected from a plurality of lanes of information based upon the movement of the user's appendage, wherein each lane of information is associated with different sources of information comprising one or more of textual, web page, newsfeed, electronic mail, and streaming video feed information;

dynamically displaying at least one portion of the information sequentially in a fixed location of a display portion of an information display device; and adjusting at least one display characteristic comprising one or more of contrast level, display format and display rate of the information displayed based upon signals from the presence, movement, and position of the user's appendage in the capacitive region.

10. The computer-readable medium as set forth in claim 9, wherein the user's appendage is one or more hands.

11. The computer-readable medium as set forth in claim 9, wherein controls for the contrast level, the display format and the display rate are presented for display.

12. The computer readable medium in claim 9, further comprising:

monitoring a further capacitive region defined between a further pair of conductive plates, wherein the capacitive region and the further capacitive region do not interfere with each other.

* * * * *